(12) United States Patent
Sykes et al.

(10) Patent No.: US 12,485,547 B2
(45) Date of Patent: Dec. 2, 2025

(54) HEAD MOUNTED DISPLAY FOR REMOTE OPERATION OF MACHINERY

(71) Applicant: Altec Industries, Inc., Birmingham, AL (US)

(72) Inventors: Westin Sykes, Gower, MO (US); Timothy J. Mourlam, Kansas City, KS (US); Aaron Beck, Kansas City, MO (US); William Naber, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 91 days.

(21) Appl. No.: 18/597,033

(22) Filed: Mar. 6, 2024

(65) Prior Publication Data

US 2024/0208066 A1 Jun. 27, 2024

Related U.S. Application Data

(63) Continuation of application No. 16/860,176, filed on Apr. 28, 2020, now Pat. No. 11,945,123.

(51) Int. Cl.
| | |
|---|---|
| B25J 9/16 | (2006.01) |
| B25J 9/04 | (2006.01) |
| B25J 13/00 | (2006.01) |
| G02B 27/01 | (2006.01) |
| H04N 7/22 | (2006.01) |

(52) U.S. Cl.
CPC ............... *B25J 9/1689* (2013.01); *B25J 9/04* (2013.01); *B25J 9/1697* (2013.01); *B25J 13/006* (2013.01); *G02B 27/0101* (2013.01); *G02B 27/0172* (2013.01); *H04N 7/22* (2013.01); *G02B 2027/0138* (2013.01)

(58) Field of Classification Search
USPC .................................................. 700/245–264
See application file for complete search history.

(56) References Cited

U.S. PATENT DOCUMENTS

| | | | | | |
|---|---|---|---|---|---|
| 5,180,122 | A | * | 1/1993 | Christian | B64F 5/20 340/905 |
| 5,286,159 | A | * | 2/1994 | Honma | B66F 11/046 182/2.11 |
| 6,024,145 | A | * | 2/2000 | Ackles | B23D 57/0084 144/34.1 |
| 6,250,588 | B1 | * | 6/2001 | Numbers | B64F 5/20 244/134 C |
| 6,325,749 | B1 | * | 12/2001 | Inokuchi | H02G 1/02 182/2.11 |
| 6,507,163 | B1 | * | 1/2003 | Allen | B25J 9/1689 318/560 |
| 7,011,171 | B1 | * | 3/2006 | Poulter | B62D 61/12 280/5.32 |
| 9,138,891 | B2 | * | 9/2015 | Herzog | H04M 1/035 |
| 10,525,596 | B2 | * | 1/2020 | Hammock | B23K 26/342 |

(Continued)

*Primary Examiner* — Jonathan L Sample
(74) *Attorney, Agent, or Firm* — Erise IP, P.A.

(57) ABSTRACT

A system and method for providing real-time, sensory information associated with a remote location using a remote capture device and a head-mounted display. In some embodiments, the system comprises a fiber-optic cable to transmit a signal comprising sensory information collected by the remote capture device to the head-mounted display. Further, the remote capture device may be secured onto a boom of an aerial device.

20 Claims, 8 Drawing Sheets

(56) References Cited

U.S. PATENT DOCUMENTS

| | | | |
|---|---|---|---|
| 10,905,508 B2* | 2/2021 | Hashimoto | B23Q 15/12 |
| 2007/0124024 A1* | 5/2007 | Okamoto | B25J 9/0003 |
| | | | 700/245 |
| 2013/0054029 A1* | 2/2013 | Huang | G05D 1/0038 |
| | | | 901/30 |
| 2018/0032130 A1* | 2/2018 | Meglan | G16H 40/63 |
| 2018/0243921 A1* | 8/2018 | Hashimoto | H04N 7/181 |
| 2020/0122321 A1* | 4/2020 | Khansari Zadeh | B25J 9/1664 |
| 2022/0018098 A1* | 1/2022 | Nakagi | G02B 27/017 |

* cited by examiner

HEAD MOUNTED DISPLAY FOR REMOTE OPERATION OF MACHINERY

RELATED APPLICATIONS

This patent application is a continuation application claiming priority benefit, with regard to all common subject matter of U.S. patent application Ser. No. 16/860,176, filed Apr. 28, 2020, and entitled "HEAD MOUNTED DISPLAY FOR REMOTE OPERATION OF MACHINERY." The above-referenced patent application is hereby incorporated by reference in its entirety into the present application.

BACKGROUND

1. Field

Embodiments of the invention relate to remote operation of machinery. More specifically, embodiments of the invention relate to a head-mounted display for providing sensory information while remotely operating machinery.

2. Related Art

Remote operation of machinery is desirable especially in hazardous environments and in locations where it would be difficult for a human to work. A significant challenge associated with performing remote operations is that the user does not have the same viewing perspective as they would during traditional work. Thus, it is difficult for a user to remotely operate machinery without the appropriate sensory information associated with the machinery in a remote location.

Further, for remote operations involving work on energized power lines, it may be difficult to transmit electrical signals including sensory information of the remote location because the remote equipment may be electrically isolated from other components such as portions of a boom of an insulated aerial device. The electrical isolation is necessary to avoid electrostatic discharge, thus traditional electrical connections cannot be used between the remote equipment and the user.

SUMMARY

Embodiments of the invention solve the above-mentioned problems by providing a system and method for providing real-time sensory information associated with a remote location using a remote capture device and a head-mounted display. In some embodiments, the system comprises a fiber-optic cable to transmit a signal comprising sensory information collected by the remote capture device to the head-mounted display.

A first embodiment of the invention is directed to a system for providing real-time, sensory information associated with a remote location to a user to allow for remote operation of machinery, the system comprising a boom assembly having a remote assembly, the remote assembly comprising a camera mount, a plurality of cameras disposed on the camera mount to receive visual information, a plurality of microphones disposed on the camera mount to receive audio information, and a remote power source for powering the plurality of cameras and the plurality of microphones, a fiber-optic cable connected to the remote assembly to transmit a signal including the visual and audio information across a dielectric gap, a mountable display comprising a visual output comprising an image display, an audio output comprising a plurality of speakers, and at least one sensor for detecting a viewing angle of the user when in use, and a processor for performing the steps of processing the signal received from the fiber-optic cable, and transmitting the received visual and audio information to the mountable display, wherein the visual information comprises a representation of the remote location based on the viewing angle of the user, wherein the audio information comprises a representation of the remote location based on the viewing angle of the user.

A second embodiment of the invention is directed to a method for providing real-time, sensory information associated with a remote location to a user to allow the user to remotely operate machinery, the method comprising the steps of receiving the sensory information of the remote location using a plurality of cameras and a plurality of microphones disposed on a camera mount in the remote location, wherein the camera mount is associated with a remote assembly attached to a boom assembly, detecting a viewing angle of the user using at least one sensor disposed on a mountable display, transmitting the sensory information across a dielectric gap using a fiber-optic cable, processing the sensory information using a processor, transmitting the sensory information to the mountable display, wherein the sensory information comprises a visual representation of the remote location adapted to be output to the user on an image display of the mountable display based on the viewing angle of the user, and an audio representation of the remote location adapted to be output to the user by a plurality of speakers disposed in the mountable display based on the viewing angle of the user.

A third embodiment of the invention is directed to a system for providing real-time, sensory information associated with a remote location to a user to allow for remote operation of machinery, the system comprising a remote assembly disposed in the remote location comprising a gimbal camera mount having a first axis of rotation, a second axis of rotation, and a third axis of rotation, the gimbal camera mount comprising a first motor for rotating the gimbal camera mount about the first axis, a second motor for rotating the gimbal camera mount about the second axis, and a third motor for rotating the gimbal camera mount about the third axis, a first camera disposed on the gimbal camera mount in a first position for collecting a first portion of visual sensory information, a second camera disposed on the gimbal camera mount in a second position distinct from the first position for collecting a second portion of visual sensory information, a first microphone disposed at a first location of the gimbal camera mount for collecting a first portion of audio sensory information, and a second microphone disposed at a second location of the gimbal camera mount opposite the first location for collecting a second portion of audio sensory information, wherein the sensory information comprises the first portion of visual sensory information, the second portion of visual sensory information, the first portion of audio sensory information, and the second portion of audio sensory information, a fiber-optic cable for transmitting the sensory information from the remote assembly across a dielectric gap, a mountable display adapted to be worn by the user on the user's head comprising at least one sensor for detecting a viewing angle of the user when in use, a first visual display for displaying a first image associated with the first portion of visual sensory information, a second visual display for displaying a second image associated with the second portion of visual sensory information, a first speaker for outputting a first audio associated with the first portion of audio sensory information, and a second speaker for outputting a second audio associated with the second portion of audio sensory information, and a controller for controlling the first motor and the second motor of the gimbal camera mount based on the viewing angle of the user when in use.

Additional embodiments of the invention are directed to a method for processing and stitching audio and video data to provide appropriate sensory information to a head-mounted display based on a viewing parameter of a user.

Yet other embodiments of the invention are directed to a remote assembly comprising a remote capture device disposed on an end of a robotic arm, wherein the robotic arm is operable to move according to a viewing parameter of a user such that the position and orientation of the remote capture device is adjusted.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
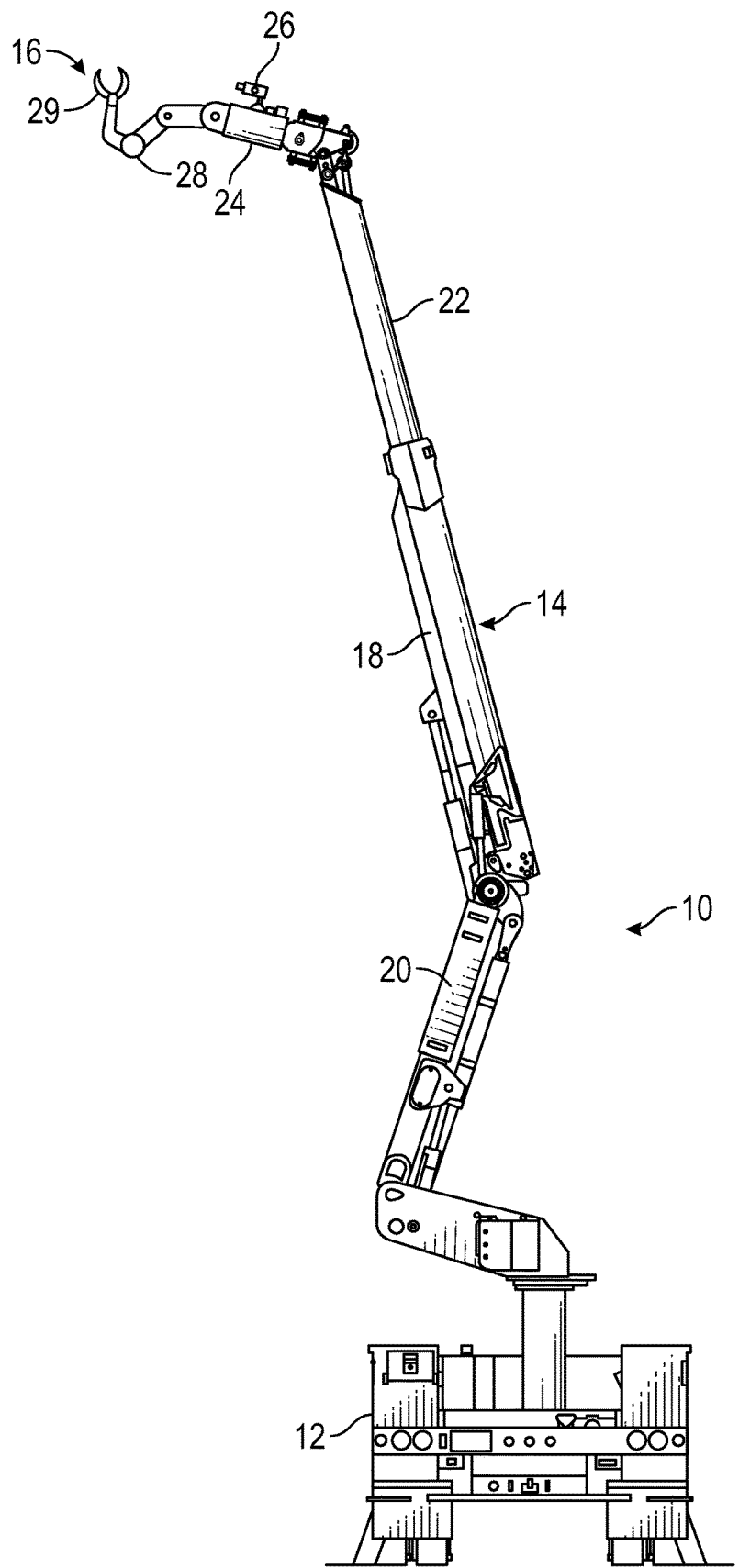
FIG. 1 is an aerial device for some embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

In some embodiments, a system for providing real-time, immersive, sensory information of a remote location is provided. Thus, such embodiments provide a solution to the above-mentioned problems by allowing the user to receive said sensory information. In some embodiments, the sensory information may be provided to the user based on a viewing parameter, such as a viewing angle of the user. The sensory information may be collected using a remote capture device installed in the remote location.

FIG. 1 depicts an aerial device 10 of some embodiments of the invention. The aerial device 10 comprises a utility vehicle 12, a boom assembly 14, and a remote assembly 16. The boom assembly 14 comprises a boom 18 having a boom proximal end 20 and a boom distal end 22. In some embodiments, the boom 18 is one of a telescoping boom 18 and an articulating boom 18. The boom assembly 14 may be attached to the utility vehicle 12 at the boom proximal end 20. The remote assembly 16 may be secured to the boom distal end 22, such that the remote assembly 16 is supported by the boom assembly 14. In some embodiments, the remote assembly 16 comprises a frame 24, a remote capture device 26, and at least one robotic arm 28. The remote assembly 16 may comprise a single robotic arm 28, as shown. The robotic arm 28 may comprise at least one tool 29 disposed at an end of the robotic arm 28. The tool 29 may be one of a grapple (as shown), a saw, a drill, an auger, a wire cutter, or any other tool 29 according to the specific application of the respective embodiment. In some embodiments, the boom 18 is used to position the remote assembly 16 in a remote location, such as, for example adjacent to an energized power line.

Figure 2:
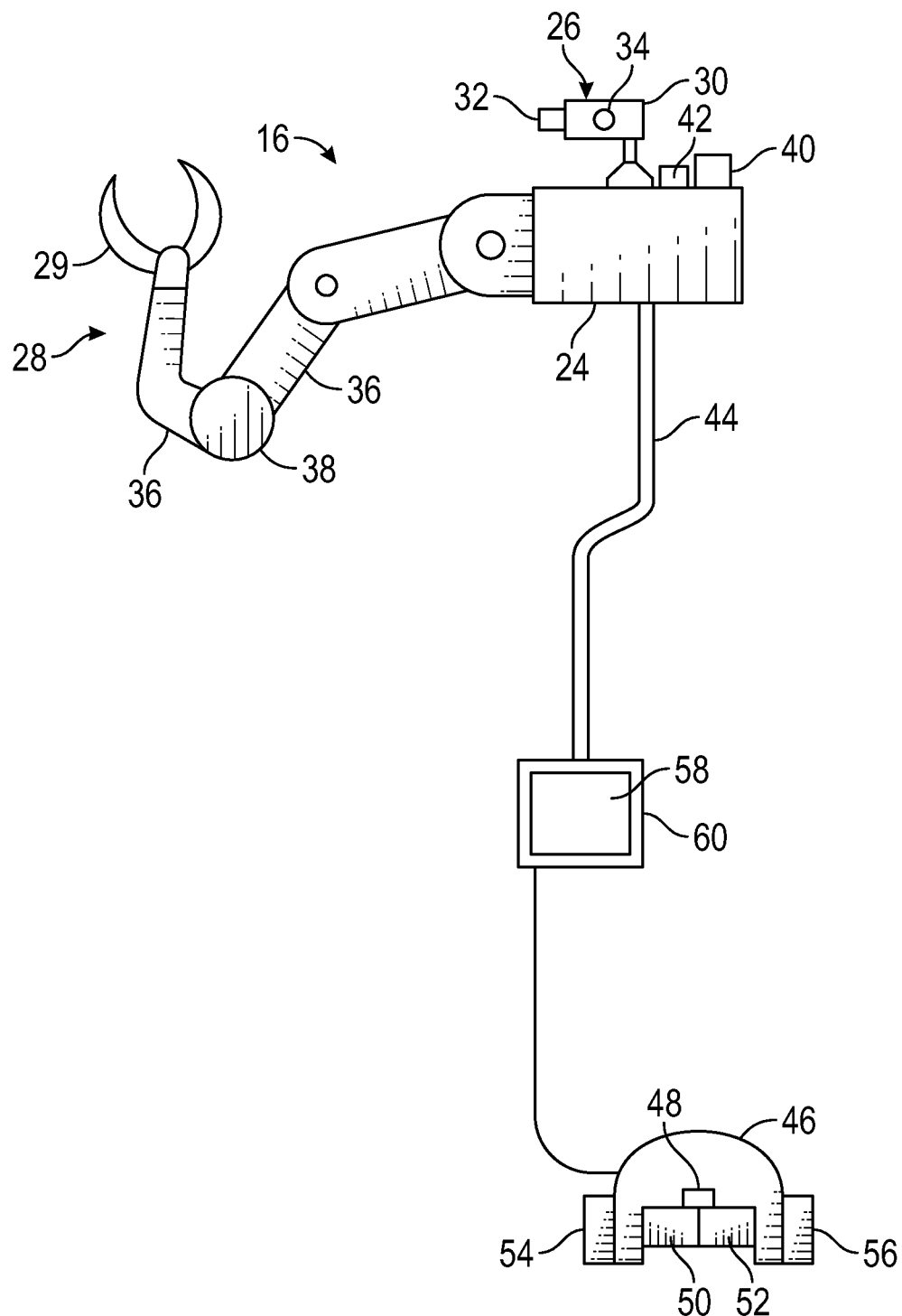
FIG. 2 is a remote assembly and head-mounted display for some embodiments of the invention.

FIG. 2 depicts the remote assembly 16. In some embodiments, the remote assembly 16 comprises frame 24, remote capture device 26, and robotic arm 28. As shown, the remote capture device 26 of some embodiments may comprise a camera mount 30, a plurality of cameras 32 disposed on the camera mount 30, and a plurality of microphones 34 disposed on the camera mount 30. The robotic arm 28 of some embodiments comprises a plurality of members 36 connected by a respective plurality of pivotable joints 38. In some embodiments, the robotic arm 28 may further comprise a plurality of motors internal to each respective pivotable joint 38 to drive rotation of the pivotable joint 38. In some embodiments, the remote assembly 16 further comprises a remote power source 40 and a controller 42. Each of the remote power source 40 and the controller 42 may be secured to the frame 24. The remote power source 40 may be used to power the remote capture device 26 and the controller 42 may be used for controlling at least one of the remote capture device 26 and the robotic arm 28. In some embodiments, the robotic arm 28 also receives power from the remote power source 40. Remote power source 40 may be an electric generator, batteries, or any other known power source.

It should be understood that the remote assembly 16, in some embodiments, is not necessarily attached to the boom 18. The remote assembly 16 may instead be attached to another device or exist as a stand-alone device. Further, the applications of the remote assembly 16 are not limited to operations associated with energized power lines. The remote assembly 16 may be used in various other remote locations. For example, in one embodiment, the remote assembly 16 may be disposed in a remote location to monitor the remote location. Additionally, the remote assembly 16 may be used as a surveillance system such that an operator can observe a monitored location in which the remote assembly 16 is installed.

In some embodiments, the remote capture device 26 may be connected to a fiber-optic cable 44. The fiber-optic cable 44 may be disposed between the remote assembly 16 and a head-mounted display 46 to bidirectionally communicate a signal to/from the remote assembly 16. In some embodiments, the fiber-optic cable 44 is desirably included to communicate said signal across a dielectric gap. In some embodiments, it may also be desirable to use the fiber-optic cable 44 based on the data transmission speed of the fiber-optic cable 44. Fiber-optic cables offer an increased data transfer rate, as well as a larger maximum data transfer capabilities, when compared with traditional electrical forms of data transfer, such as copper cables. Further, in some embodiments, a plurality of fiber-optic cables 44 may be used. For example, a first fiber-optic cable may be used to transmit a signal from the remote assembly 16 to the head-mounted display 46 and a second fiber-optic cable may be used to transmit a signal from the head-mounted display 46 to the remote assembly 16.

The head-mounted display 46 comprises at least one sensor 48 for detecting a viewing angle and/or viewing position of a user, a first visual display 50, a second visual display 52, a first speaker 54, and a second speaker 56. The head-mounted display 46 is configured to be worn by a user on the user's head. In some embodiments, the first visual display 50 and the second visual display 52 may be liquid crystal display (LCD) screens or any other suitable display device to be located in front of the user's eyes like goggles. In some embodiments, the head-mounted display 46 is connected to a processor 58 for processing the signal. Alternatively, the processor 58 may be disposed on the display 46, on the remote assembly 16, or on the utility vehicle 12. Further, the processor 58 may be part of a central computer 60, as shown, which may be disposed on the utility vehicle 12 or in another remote location. In some embodiments, a plurality of processing elements or processors may be used. It should be understood that the processor 58 as described herein may refer to any of a single processing element and a plurality of processing elements. Additionally, the plurality of processing elements may be distributed across various locations. For example, in some embodiments, a first processing element may be disposed on the remote assembly 16, a second processing element may be disposed on the utility vehicle 12, and a third processing element may be disposed within the head-mounted display 46.

Figure 8:
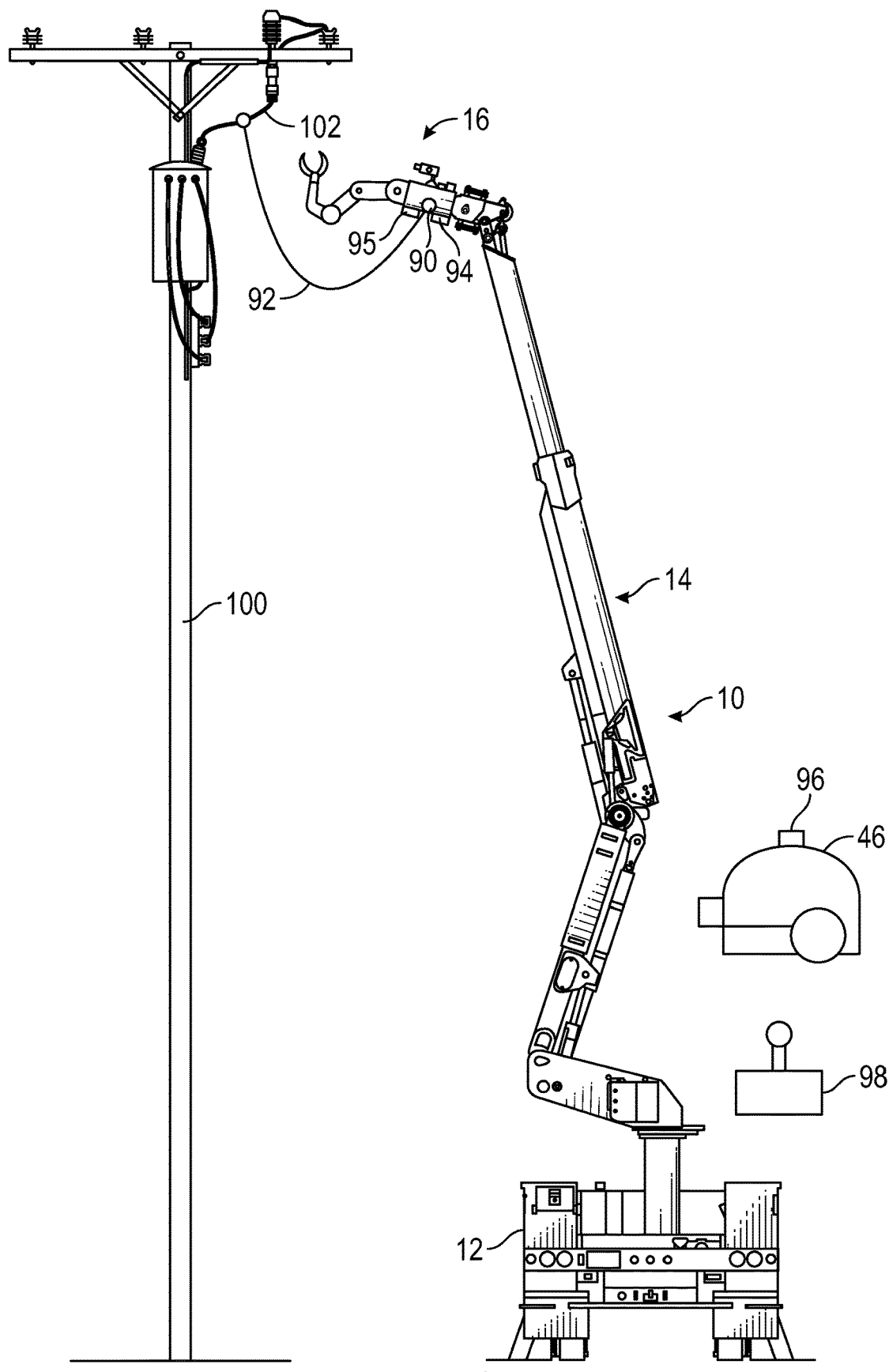
FIG. 8 depicts an exemplary operation of the aerial device for some embodiments of the invention.

In some embodiments, the head-mounted display 46 may only comprise a single visual display that covers the entire viewing area. In such embodiments, it may be desirable to use a single visual display to reduce processing power and/or time. However, in some other embodiments, it is desirable to use both the first visual display 50 and the second visual display 52 to display a stereoscopic virtual representation of the remote location such that the user is able to perceive depth in 3D. Additionally, in some embodiments, a heads-up display (HUD) may be displayed to the user superimposed upon the first visual display 50 and the second visual display 52. The HUD may be a digital and visual representation of additional information. For example, the HUD may include a visual representation of the machine diagnostic information relating to the robotic arm 28, the utility vehicle 12, and/or the boom 18. It should also be understood that the HUD, in some embodiments, includes a visual representation of a timer, a clock, a measured voltage at the boom tip, and/or a warning indication. In some embodiments, additional information may be shared with the user via an audio cue. The audio cue may be a sound played over the first speaker 54 and/or second speaker 56. In some embodiments, the audio cue may be an alarm indicative of an operating condition of the aerial device 10. In some embodiments, for example, an alarm may be played over the first speaker 54 and/or the second speaker 56 to indicate an inadvertent loss of electrical bonding between the remote assembly 16 and an energized power line. In such an example, the electrical bonding may be measured by a sensory device 95, as shown in FIG. 8, disposed on the remote capture device 26. In one embodiment, the sensory device is a voltmeter.

Figure 3A:
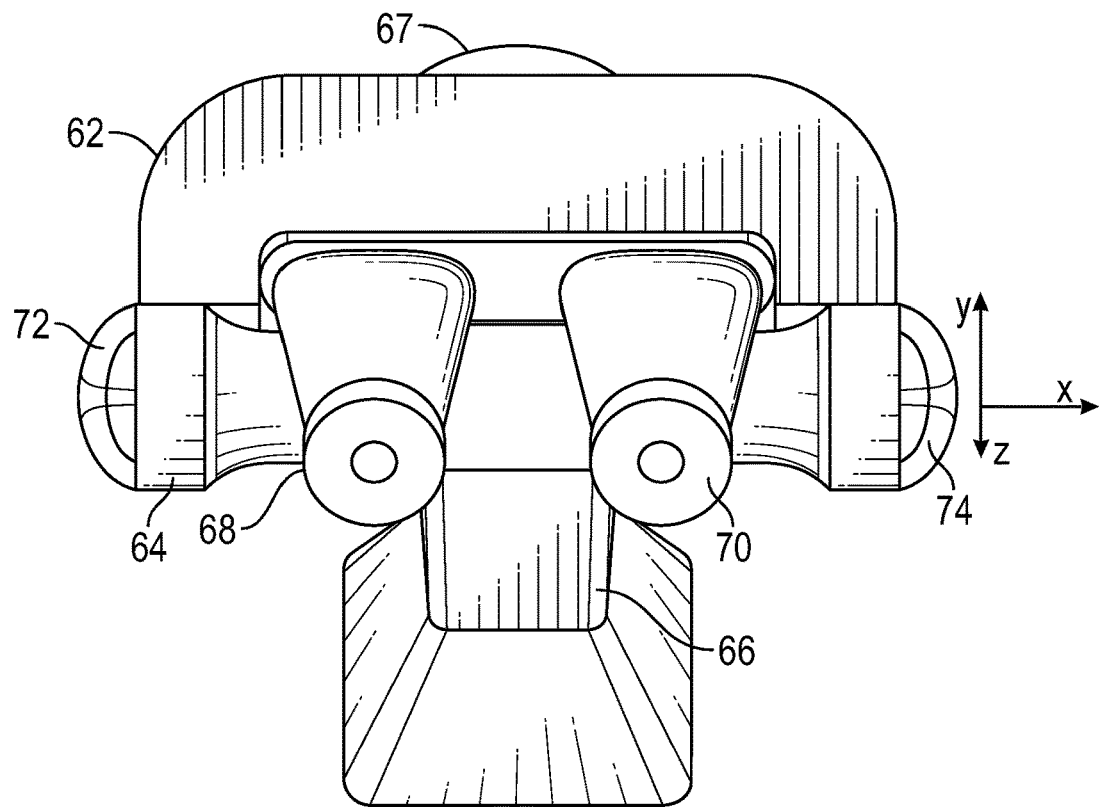
FIG. 3A is a gimbal camera mount for some embodiments of the invention.

FIG. 3A depicts a gimbal camera mount 62. In some embodiments, the remote capture device 26 comprises the gimbal camera mount 62, secured to the frame 24. In such embodiments, the gimbal camera mount 62 may be operable to rotate about a first axis, a second axis, and a third axis. Rotation of the gimbal camera mount 62 may be carried out using a first motor 64 disposed within the gimbal camera mount 62, a second motor 66 disposed within the gimbal camera mount 62, and a third motor 67 disposed within the gimbal camera mount 62. Each of the first motor 64, the second motor 66, and the third motor 67 may be used to rotate the gimbal camera mount 62 about a respective one of the first axis, the second axis, and the third axis. In some embodiments, the first axis may correspond to the X-axis, as shown, the second axis may correspond to the Y-axis, and the third axis may correspond to the Z-axis, as shown. Further, in some embodiments, the first, second, and third motors 64, 66, and 67 rotate the gimbal camera mount 62 to control roll, pitch, and yaw of the gimbal camera mount 62. In such embodiments, the first motor 64 controls the pitch of the gimbal camera mount 62, the second motor 66 controls the yaw of the gimbal camera mount 62, and the third motor 67 controls the roll of the gimbal camera mount 62. In some embodiments, the remote capture device 26 further comprises a first camera 68 disposed on the gimbal camera mount 62, a second camera 70 disposed on the gimbal camera mount 62, a first microphone 72 disposed on a first end of the gimbal camera mount 62, and a second microphone 74 disposed on second end of the gimbal camera mount 62. In some embodiments, the remote power source 40 may be used to power at least one of the first motor 64, the second motor 66, the third motor 67, the first camera 68, the second camera 70, the first microphone 72, and/or the second microphone 74.

It should be understood that the first camera 68 and the second camera 70 may be used similarly to the plurality of cameras 32. In some embodiments, the plurality of cameras 32 comprises the first camera 68 and the second camera 70. It should also be understood that the first microphone 72 and the second microphone 74 may be used similarly to the plurality of microphones 34. In some embodiments, the plurality of microphones 34 comprises the first microphone 72 and the second microphone 74.

In some embodiments, the signal sent along the fiber-optic cable 44 comprises sensory information collected by at least one of the first camera 68, the second camera 70, the first microphone 72, and the second microphone 74, such that the processor 58 processes the sensory information to be transmitted to the head-mounted display 46. In some embodiments, the first visual display 50 is configured to display a first portion of visual sensory information collected by the first camera 68. Similarly, the second visual display 52 is configured to display a second portion of visual sensory information collected by the second camera 70. Additionally, the first speaker 54 may output a first portion of audio sensory information collected by the first microphone 72, and the second speaker 56 may output a second portion of audio sensory information collected by the second microphone 74. In some embodiments, the first visual display 50 is located such that it can be viewed by a first eye of the user and the second visual display 52 is located such that it can be viewed by a second eye of the user when in use. Similarly, the first speaker 54 may be located near a first ear of the user and the second speaker 56 may be located near a second ear of the user when in use. Thus, the head-mounted display 46 is capable of producing stereoscopic vision and binaural audio for the user when worn on the user's head. The stereoscopic vision enables the user to see in 3D to perceive visual depth similar to how humans naturally perceive visual depth.

In some embodiments, each of the first camera 68, the second camera 70, the first microphone 72, and the second microphone 74 may be positioned on the gimbal camera mount 62 according to the eyes and ears of the user. Accordingly, the first camera 68 and the second camera 70 may be positioned on the front of the gimbal camera mount 62, as shown, to mimic the placement of a typical user's eyes on the user's head. Similarly, the first microphone 72 and second microphone 74 may be positioned on either side of the gimbal camera mount 62 to mimic the placement of a typical user's ears on the user's head.

The at least one sensor 48 may be one of an accelerometer, a gyroscope, a light sensor, or any other type of sensor 48 suitable to detect the viewing angle of the user. Similarly, the sensor 48 may be operable to detect the viewing position of the user. In some embodiments, it may be preferable that the sensor 48 detect a change in the viewing angle or a change in the viewing position of the user. In some embodiments, a plurality of different types of sensors in different locations may be used to include redundancy or to increase accuracy. For example, an accelerometer may be used to detect an acceleration signal, the acceleration signal may be integrated to yield a velocity signal which may then be compared to a velocity signal detected by a gyroscope, wherein each of the accelerometer and the gyroscope use a light sensor as a reference. It should be understood that, in some embodiments, any of the sensors described herein may be included in both the head-mounted display 46 and on the remote assembly 16. Sensors on the remote assembly 16 may be used to collect sensory information or as part of the control process to adjust the remote capture device 26 in order to match the viewing parameter of the user. For example, a first accelerometer may be placed on the head-mounted display 46 to sense movement of the head-mounted display 46 and a second accelerometer may be placed on the remote capture device 26 to sense movement of the remote capture device 26. The readings of the first accelerometer and the second accelerometer may be compared and used by the controller 42. In some embodiments, the controller 42 may use the data from the second accelerometer as a feedback signal to control movement of the remote capture device 26.

The sensor 48 may send a signal indicative of the viewing angle of the user to the controller 42 via the fiber-optic cable 44. The controller 42 may then control operation of the first motor 64, the second motor 66, and the third motor 67 to rotate the gimbal camera mount 62 based on the viewing angle of the user. The gimbal camera mount 62 may be rotated such that the angle of the first camera 68 and the second camera 70 correspond to the viewing angle of the user. Accordingly, the first visual display 50 and second visual display 52 show a visual representation of the remote location that the user would perceive if the user was in the remote location with a similar viewing angle. Thus, the user is able to look around freely in the remote location to observe the surroundings of the remote location. Further, since the first speaker 54 and the second speaker 56 are disposed on the ends of the gimbal camera mount 62, as shown, the user can hear the sounds from the remote location as if the user was in the remote location facing in a similar viewing angle.

In some embodiments, the user is not located near or at the remote location, but in a completely separate location or on the ground beneath the remote location. It may be preferable that the user is not in the remote location, especially when the remote location is a hazardous environment, such as, for example, an area around an energized power line. Further, it may be preferable that the user not be in the remote location in embodiments where it is difficult for the user to reach the remote location. In such embodiments, where the user is in a completely separate location, it may be desirable to communicate signals between the head-mounted display 46, the processor 58, and the remote assembly 16 using a wireless connection, such as, for example, an internet connection, a Bluetooth connection, or via radio signals.

In some embodiments, it may be desirable to increase the sampling rate of the sensor 48 on the head-mounted display 46, such that the viewing angle is updated so that the direction of the gimbal camera mount 62 consistently matches the viewing angle of the user. The sampling rate, in some embodiments, for example, may be selected from the following sampling frequencies: 60 Hz, 100 Hz, 1,000 Hz, and 10,000 Hz. In some embodiments, the sampling rate may another sampling frequency. Thus, a lag is reduced. Lag as described herein, refers to the time between when the viewing angle of the user is changed and when the change is implemented by the gimbal camera mount 62 to move the cameras. Further, methods of reducing lag for some embodiments involve optimizing processing such that the least amount of processing is carried out in order to perform the necessary functions of the invention according to each particular embodiment. Additional forms of lag may include the time between when the sensory information is collected by the remote capture device 26 and when the sensory information is shared with the user via the head-mounted display 46. It should be understood that said additional forms of lag may also be reduced using any lag reduction method described herein or any other known lag reduction method, such as, for example, processing optimization, optimizing sampling rate, and fiber-optic transmission.

Figure 3B:
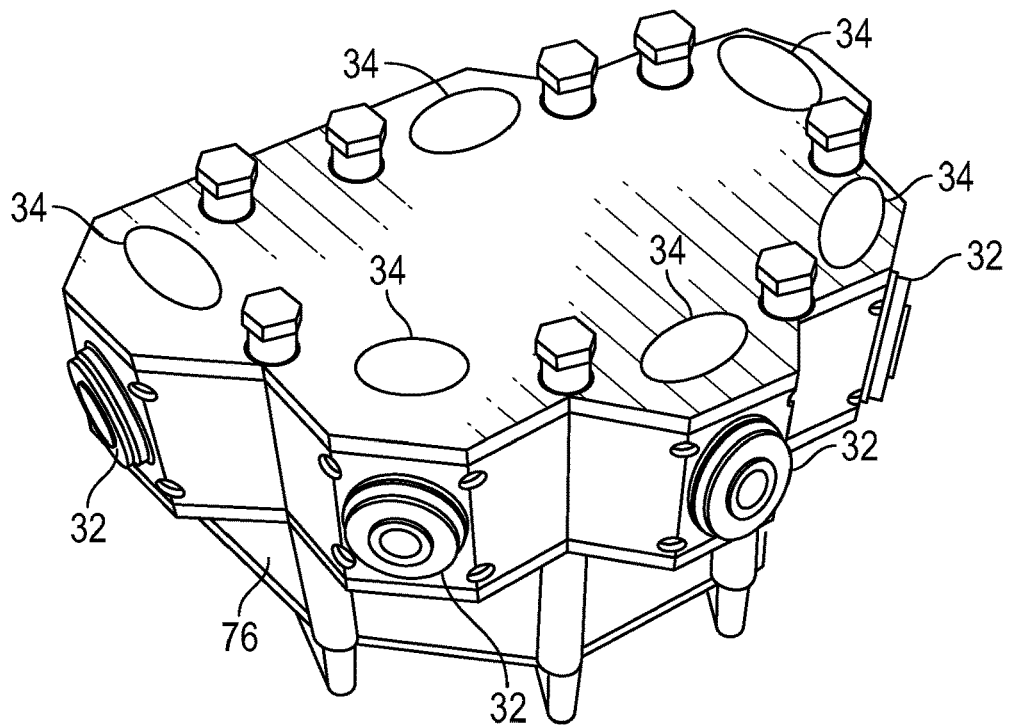
FIG. 3B is a static camera mount for some embodiments of the invention.

FIG. 3B depicts a static camera mount 76 for some embodiments. In such embodiments, the remote capture device 26 of the remote assembly 16 comprises the static camera mount 76, a plurality of cameras 32 secured to the static camera mount 76, a plurality of microphones 34 secured to the static camera mount 76, and remote power source 40. Unlike the gimbal camera mount 62 of FIG. 3A, the static camera mount 76 is not operable to rotate independently from the frame 24. The static camera mount 76 may be secured to the frame 24 of the remote assembly 16 using at least one fastener means, such as, for example, a bolt, a screw, an adhesive, and/or a clip, or other appropriate fastening material. The plurality of cameras 32 may comprise two or more cameras 32. For example the plurality of cameras may comprise six cameras, such as shown in FIG. 3B. In some embodiments, the plurality of cameras 32 is an array of cameras 32. Each of the plurality of cameras 32 may be oriented in a different direction. In some embodiments, each of the cameras 32 is positioned to face radially outward from the static camera mount 76. Each of the cameras 32 is configured to capture visual sensory information from the remote location. In some embodiments, the static camera mount 76 may comprise fewer backwards facing cameras 32 to reduce required processing power. Accordingly, 3D stereoscopic vision may not be available for a backwards viewing direction. In certain embodiments, it may be preferable to sacrifice 3D stereoscopic vision in a backwards viewing direction of the static camera mount 76 in order to reduce processing power, especially for applications where the user will primarily be facing forward. The plurality of microphones 34 may comprise two or more microphones 34 for collecting audio sensory information from the remote location. For example, the plurality of microphones may comprise six microphones, such as shown in FIG. 3B. In some embodiments, the plurality of microphones 34 is an array of microphones 34.

In some embodiments, the processor 58 receives a plurality of images from the respective plurality of cameras 32. The processor 58 may execute computer executable instructions, that when executed, perform a method of image stitching. The image stitching process may be operable to stitch the plurality of images together into a stitched image. Further, in some embodiments, stitching is only processed for a portion of the plurality of images. For example, the image stitching process may only process a portion of the images that is associated with the viewing angle of the user to optimize processing. In some embodiments, a portion of the stitched image is sent to the visual display of the head-mounted display 46. The portion of the stitched image may be selected by the processor 58 based on the viewing angle of the user.

Similarly, in some embodiments, the processor 58 may execute computer executable instructions, that when executed, perform an audio stitching and interpolation process. The audio stitching and interpolation process may be operable to stitch the audio sensory information from each of the plurality of microphones 34 into a stitched audio sample. The processor 58 may then perform an interpolation process to determine a portion of the stitched audio sample associated with the viewing angle of the user. In some embodiments, the processor 58 may determine a first portion of the stitched audio sample associated with a right side of the user and a second portion of the stitched audio sample associated with a left side of the user. The right side and left side of the user may be determined according to the viewing angle of the user. The processor 58 may then send the first portion of the stitched audio to the first speaker 54 of the head-mounted display 46 and send the second portion of the stitched audio to the second speaker 56 of the head-mounted display 46.

In some embodiments, the processor 58 selects a plurality of portions of the stitched image to be sent to a respective plurality of displays. Each of the portions of stitched images may be selected from the stitched image based on the viewing angle of the respective user of each display. Thus, multiple users can receive independent visual sensory information of the remote environment. In such embodiments, it may be desirable to use the plurality of displays, such that each user receives visual sensory information of the remote environment based on that user's viewing angle independent of the viewing angle of other users. Thus, a team of multiple users may operate equipment in the remote environment simultaneously. Further, the processor 58 may select individual audio for each of the displays based on the viewing angle of each respective user, such that the user receives audio sensory information of the remote environment independent of the viewing angle of other users.

It should be understood, that in some embodiments, the remote capture device 26 may comprises either of the gimbal camera mount 62 and the static camera mount 76, as well as any other device suitable to collect sensory information of the remote location. In some embodiments, it may be desirable to use the gimbal camera mount 62 instead of the static camera mount 76, because of errors associated with the image stitching process. Errors in the image stitching process may be especially prevalent for close range images. Thus, in close range applications, where the remote capture device 26 collects images of close objects, it is desirable to use the gimbal camera mount 62. It should also be understood that the sensory information is not limited to audio and visual information. Embodiments are contemplated in which the sensory information comprises any of audio information, visual information, temperature information, positional information, angular information, electrical information, humidity information, measured force information, and a combination thereof, as well as any other suitable sensory information.

Figure 4:
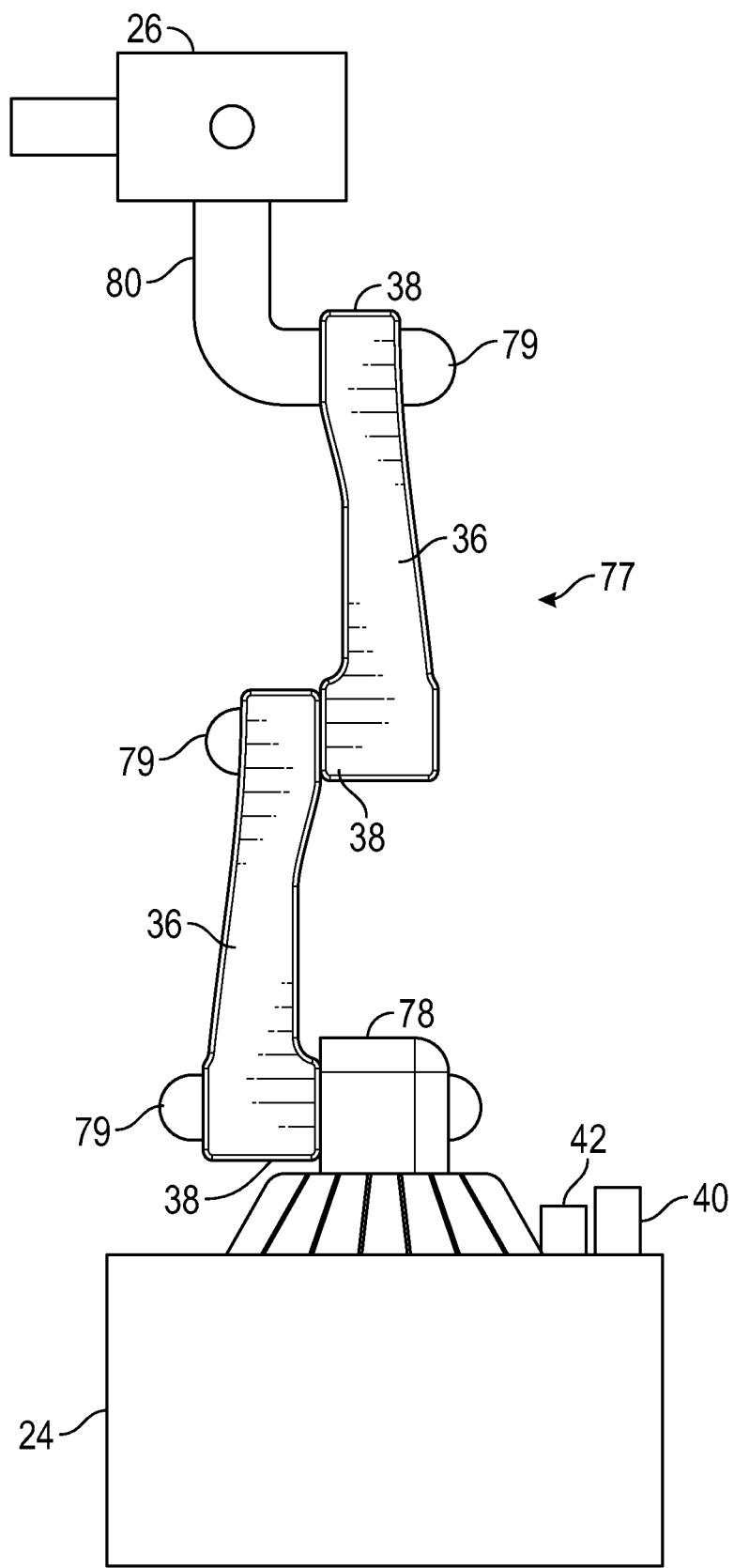
FIG. 4 is a camera-supporting robotic arm for some embodiments of the invention.

FIG. 4 depicts a camera-supporting robotic arm 77 for some embodiments of the invention. In such embodiments, the remote assembly 16 further comprises the camera-supporting robotic arm 77, as shown. The camera-supporting robotic arm 77 may comprise the plurality of members 36 connected by the respective plurality of pivotable joints 38, similar to the robotic arm of FIG. 2, a proximal end 78 secured to the frame 24, and a distal end 80 to support the remote capture device 26 of various embodiments. For example, the remote capture device 26 may be secured to the distal end 80 of the camera-supporting robotic arm 77. Thus, the position of the remote capture device 26 can be selected by moving the camera-supporting robotic arm 77. In such embodiments, the viewing angle and the viewing position of the user may be detected by the at least one sensor 48 of the head-mounted display 46 and be used to determine the position of the camera-mounted robotic arm. In some such embodiments, the camera-supporting robotic arm 77 may receive power from the remote power source 40 and be controlled by the controller 42.

For example, if the at least one sensor 48 detects that the viewing angle/position of the user is indicative of the user leaning forward and looking down, the processor 58 may send a signal to the controller 42 requesting that the camera-supporting robotic arm 77 also lean forward and face the remote capture device 26 downwards. The controller 42 may then send a signal to at least one motor 79 of the camera-supporting robotic arm 77. The motor 79 may be driven according to said signal from the controller 42 to reposition at least one of the plurality of members 36 of the camera-supporting robotic arm 77, such that the camera-supporting robotic arm 77 leans forward and the remote capture device 26 is faced downwards. In some embodiments, a motor 79 may be placed at each respective pivotably joint 38 to rotate the members 36 about the pivotable joint 38.

In some embodiments, both the camera-supporting robotic arm 77 and the remote capture device 26 may be moved simultaneously such that the remote capture device 26 is supported at a position associated with the viewing position and facing in the viewing angle. For example, in embodiments where the remote capture device 26 comprises the gimbal camera mount 62, the camera-supporting robotic arm 77 may be moved to match the viewing position of the user and the gimbal camera mount 62 may be rotated to match the viewing angle of the user.

Figure 5:
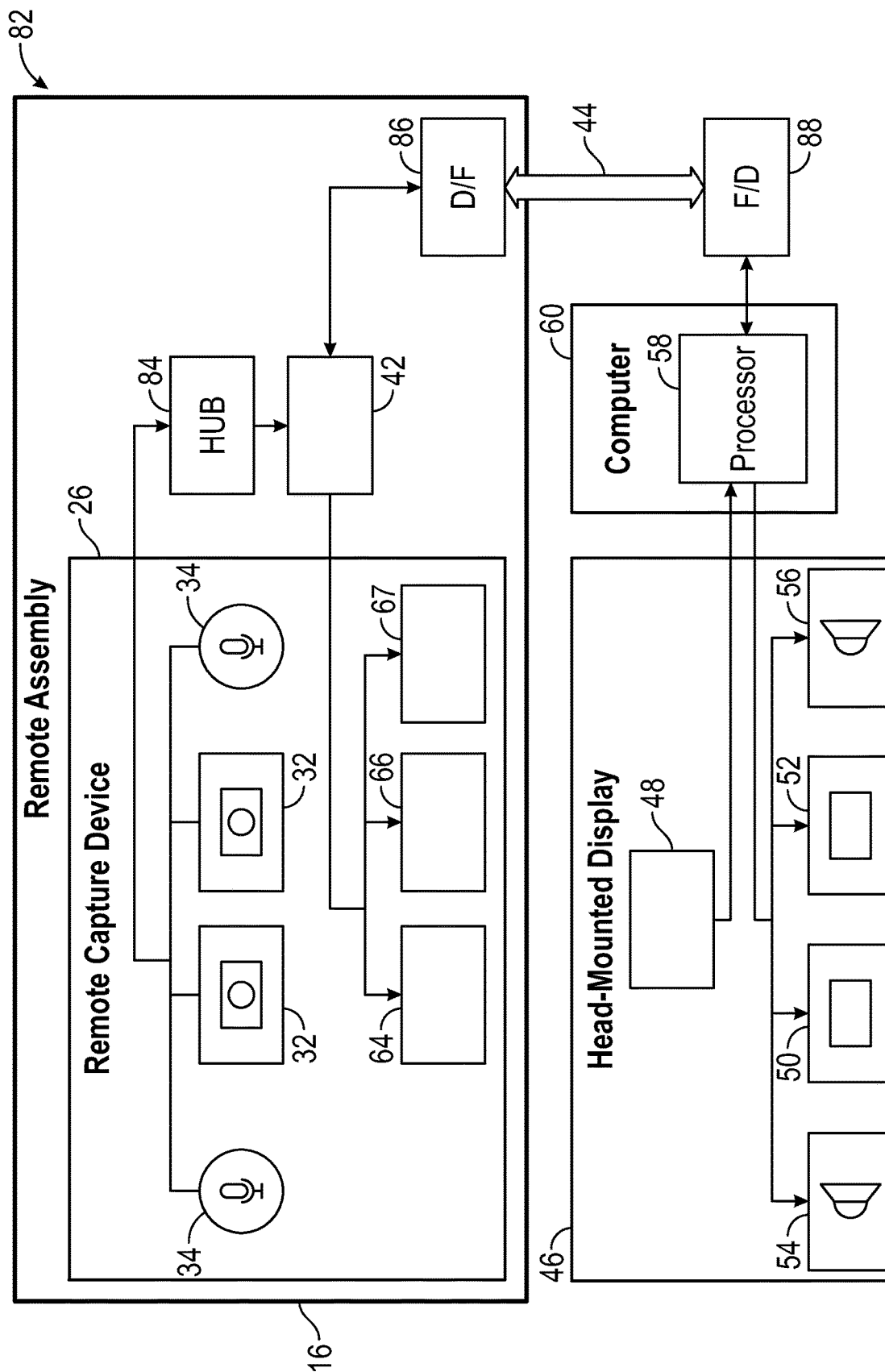
FIG. 5 is a block diagram relating to some embodiments of the invention.

FIG. 5 depicts a block diagram 82 relating to some embodiments of the invention. As can be seen in the block diagram 82, the remote assembly 16 comprises the remote capture device 26, and the controller 42. In some embodiments, the controller 42 controls the first motor 64, second motor 66, and third motor 67 of the remote capture device 26 to adjust the perspective of the remote capture device 26. In some embodiments, the remote assembly 16 further comprises at least one digital Hub 84 and at least one digital to fiber-optic converter 86. The digital Hub 84 may receive visual sensory information from the plurality of cameras 32, which may be first camera 68 and second camera 70 for some embodiments, as well as audio sensory information from the plurality of microphones 34. In some embodiments, audio sensory information may alternatively be collected using the first microphone 72 and the second microphone 74. In some embodiments, the digital Hub 84 is a USB Hub, such as, for example, a USB 3.0 Hub operable to receive digital signals in USB form. The digital Hub 84 is operable to send a signal associated with the sensory information, which comprises the visual sensory information and the audio sensory information to the digital to fiber-optic converter 86. The digital to fiber-optic converter 86 converts the sensory information into a fiber-optic signal which is sent through the fiber-optic cable 44 to the processor 58.

In some embodiments, the processor 58 may be a component of the central computer 60. The central computer 60 may be disposed in various locations, such as, for example on the head-mounted display 46 and on the utility vehicle 12. Before arriving at the processor 58, the fiber-optic signal may be converted back to a digital signal using a fiber-optic to digital converter 88. The processor 58 then processes the digital signal and sends an output signal to the head-mounted display 46. The head-mounted display 46 comprises the at least one sensor 48, the first visual display 50, the second visual display 52, the first speaker 54, and the second speaker 56.

Figure 6:
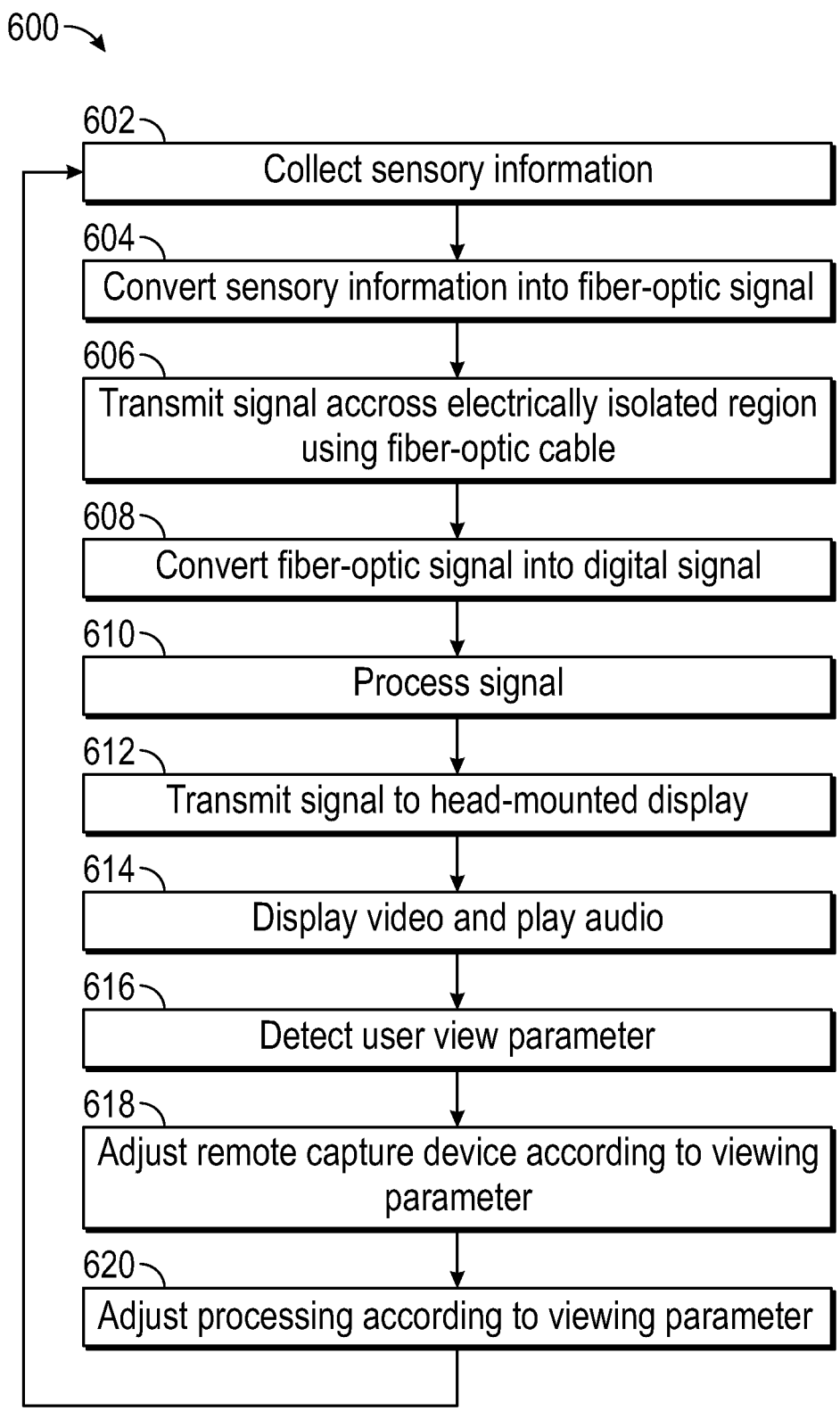
FIG. 6 is a flow diagram depicting method steps for some embodiments of the invention.

FIG. 6 depicts a flow diagram 600 having process steps relating to some embodiments of the invention. At step 602, sensory information is collected using the remote capture device 26. The sensory information may be collected using any of the plurality of cameras 32, the plurality of microphones 34, and/or any other suitable recording device. In some embodiments, the sensory information comprises visual sensory information and audio sensory information. Alternatively, or additionally, the sensory information may comprise haptic information any other type of sensory information described herein. In some embodiments, the sensory information may be collected as one of a digital or analog signal. Further, in some such embodiments, the sensory information is collected as an analog signal and converted to a digital signal using an analog to digital (A/D) convertor. The sensory information may be compiled into the digital hub 84 to create a combined digital signal associated with the sensory information.

At step 604, the digital signal is converted to a fiber-optic signal using the digital to fiber-optic converter 86. In some embodiments, where the signal is an analog signal, the analog signal may be converted to a fiber-optic signal using an analog to fiber-optic converter. At step 606, the fiber-optic signal is transmitted across an electrically isolated region using the fiber-optic cable 44. The electrically isolated region may be a dielectric gap, through which electricity is not transmitted. At step 608, the fiber-optic signal is converted back into a digital signal using a fiber-optic to digital converter 88.

At step 610, the signal is processed using the processor 58. In some embodiments, the signal may be processed in order to stitch together a plurality of images from the sensory information into a stitched image. The processing may further comprise a step of selecting a portion of the stitched image associated with the viewing angle of the user and interpolating between visual information of the sensory information to select a portion of visual information associated with the viewing angle of the user. In some embodiments, only a portion of the sensory information is processed. The processing may also include the audio stitching and interpolation process, as described above. It should be understood that the audio stitching and interpolation may be optimized similarly to the image stitching process. For example, in some embodiments, only a select portion of the audio sensory information associated with the viewing parameter of the user is processed and stitched. The select portion of audio sensory information may be the portion of audio sensory information from a select portion of the plurality of microphones 34.

At step 612, the processed signal is transmitted to the head-mounted display 46 worn by the user. The processed signal may be distributed to the first visual display 50, the second visual display 52, the first speaker 54, and the second speaker 56, such that each component receives a respective portion of the processed signal. The processed signal is then output by the head-mounted display 46. At step 614, visual output is displayed and audio output is played respectively by the visual displays and the speakers of the head-mounted display 46. Each of the visual output and the audio output is representative of the original sensory information collected at step 602 such that the user receives a virtual representation of the remote location.

At step 616, a user viewing parameter is detected using the at least one sensor 48 disposed on the head-mounted display 46. The viewing parameter may comprise any of the viewing angle, the viewing position, and/or a combination thereof. A signal indicative of the viewing parameter may be transmitted from the head-mounted display 46 to either or both of the processor 58 or the controller 42.

At step 618, the remote capture device 26 is adjusted according to the viewing parameter detected at step 616. The adjustment of the remote capture device 26 may involve moving or rotating the remote device, such as, for example, rotation of the gimbal camera mount 62 and/or movement of the camera-supporting robotic arm 77. In some embodiments, such as the static camera mount 76 embodiments described above, the remote capture device 26 may not be physically adjusted. Rather, in such embodiments, a software adjustment can be made.

At step 620, the processing of the processor 58 is adjusted according to the viewing parameter collected at step 616. The adjustment may involve any of changing the portion of the sensory information that is processed, changing a selection parameter for selecting the portion of sensory information, and updating a viewing parameter input of the processor 58. Further, in some embodiments, additional adjustments may be made that may not be based on the viewing parameter, such as, for example, filtering the sensory information, noise cancellation, and vibration reduction of video. In some embodiments, it may be desirable to remove a select portion of the sensory information using the processor 58. For example, the processor 58 may be operable to extract sounds associated with moving the remote capture device 26, such that the operator does not hear these sounds.

Additionally, the processor 58 may be operable to mitigate vibration within the video associated with movement of the remote capture device 26 such that the user does not experience vibration of the images on the display when the remote capture device 26 is moved. Vibration may also be mitigated physically using a vibration damper disposed on the remote capture device 26 or on the frame 24 of the remote assembly 16.

In some embodiments, it may be desirable to include additional functions, such as a zoom function. In such embodiments, the user may request a zoom parameter, which may be an additional viewing parameter. A signal indicative of the requested zoom parameter may be sent to the processor 58 and/or the controller 42 to adjust the zoom of the user's view. The zoom may be adjusted at either of step 618 or step 620. Zoom adjustment may be made to the remote capture device 26 using the controller 42 to adjust a lens of the plurality of cameras 32 at step 618. Alternatively, a software zoom adjustment may be made using the processor 58 to zoom in on the images sent to the first visual display 50 and the second visual display 52.

It should be understood that any of the steps described above may be absent in some embodiments of the invention, as well as additional steps be added. Further, embodiments are contemplated that perform the above steps in any order, as well as simultaneously. For example, the remote capture device 26 may be adjusted while sensory information is collected. It should also be understood that the steps may be performed continuously. For example, the processor 58 may continuously process the signal received from the remote capture device 26 and the viewing parameter may be constantly updated by the sensor 48 of the head-mounted display 46, such that the visual representation of the remote location displayed on the visual displays consistently matches the viewing angle of the user.

Figure 7:
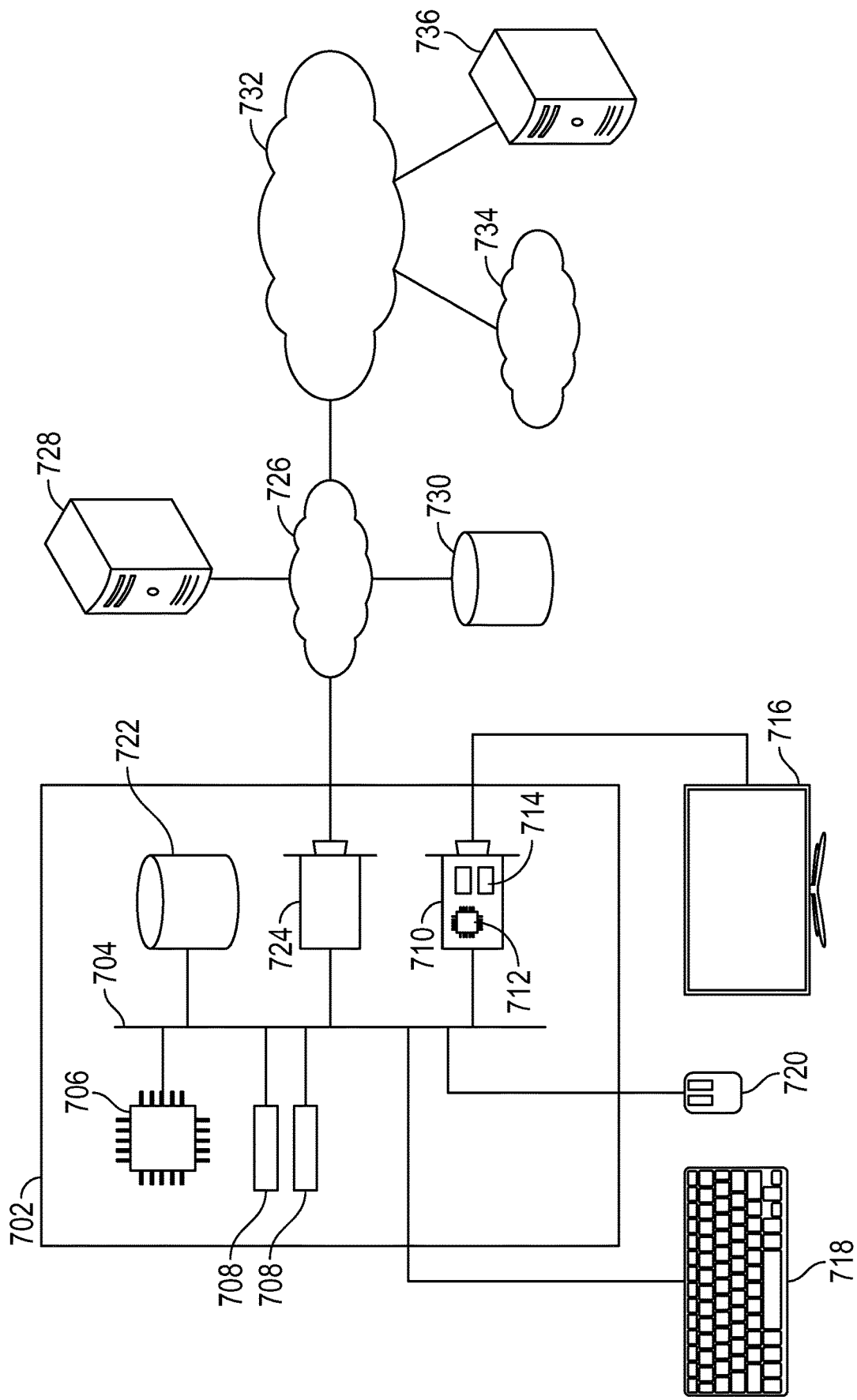
FIG. 7 is a hardware platform for some embodiments of the invention.

In FIG. 7, an exemplary hardware platform for certain embodiments of the invention is depicted. Computer 702 can be a desktop computer, a laptop computer, a server computer, a mobile device such as a smartphone or tablet, or any other form factor of general- or special-purpose computing device. Depicted with computer 702 are several components, for illustrative purposes. In some embodiments, certain components may be arranged differently or absent. Additional components may also be present. Included in computer 702 is system bus 704, whereby other components of computer 702 can communicate with each other. In certain embodiments, there may be multiple busses or components may communicate with each other directly. Connected to system bus 704 is central processing unit (CPU) 706. Also attached to system bus 704 are one or more random-access memory (RAM) modules 708. Also attached to system bus 704 is graphics card 710. In some embodiments, graphics card 710 may not be a physically separate card, but rather may be integrated into the motherboard or the CPU 706. In some embodiments, graphics card 710 has a separate graphics-processing unit (GPU) 712, which can be used for graphics processing or for general purpose computing (GPGPU). Also on graphics card 710 is GPU memory 714. Connected (directly or indirectly) to graphics card 710 is display 716 for user interaction. In some embodiments, no display is present, while in others it is integrated into computer 702. Similarly, peripherals such as keyboard 718 and mouse 720 are connected to system bus 704. Like display 716, these peripherals may be integrated into computer 702 or absent. Also connected to system bus 704 is local storage 722, which may be any form of computer-readable media and may be internally installed in computer 702 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through the fiber-optic cable 44. Examples of stored information include computer-usable instructions, data structures, program modules, and other data representations.

Finally, network interface card (NIC) 724 is also attached to system bus 704 and allows computer 702 to communicate over a network such as network 726. NIC 724 can be any form of network interface known in the art, such as Ethernet, ATM, fiber, Bluetooth, or Wi-Fi (i.e., the IEEE 802.11 family of standards). NIC 724 connects computer 702 to local network 726, which may also include one or more other computers, such as computer 728, and network storage, such as data store 730. Generally, a data store such as data store 730 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 728, accessible on a local network such as local network 726, or remotely accessible over Internet 732. Local network 726 is in turn connected to Internet 732, which connects many networks such as local network 726, remote network 734 or directly attached computers such as computer 736. In some embodiments, computer 702 can itself be directly connected to Internet 732.

It should be understood that, in some embodiments, the computer 702 may be the central computer 60 described in reference to FIG. 5 and may perform similar operations. Similarly, the CPU 706 may be processor 58 described above. Additionally, instructions to perform any of the steps described in reference to FIG. 6 may be stored on the local storage 722.

In some embodiments, any other display may be used to perform any operation described herein with respect to the head-mounted display, such as the display 716. In such embodiments, the display may be presented to the user by any suitable means. For example, the display may be a computer monitor, a television screen, a mobile phone display, etc. Further, in some embodiments, a plurality of displays may be used selected from any combination of the types of displays described herein, such as, for example, a computer screen and the head-mounted display 46. In some embodiments, a plurality of head-mounted displays may be used with each of the head-mounted displays receiving independent sensory information, which can be worn by multiple users.

FIG. 8 shows an exemplary operation for some embodiments of the invention. In such embodiments, the aerial device 10 of FIG. 1 may be included, which comprises the utility vehicle 12, the boom assembly 14, and the remote assembly 16. In some embodiments, the aerial device 10 may be an insulated aerial device 10 with at least a portion of the aerial device 10 being electrically insulated such that electricity is not transmitted through said portion of the aerial device 10. In the exemplary operation, the aerial device 10 may further comprise at least one bonding point 90. The bonding point 90 may be electrically bonded to an energized power line 102 via a bonding cable 92. In some embodiments, the bonding point 90 may be located on the remote assembly 16, on the boom 18 at the boom distal end 22, and/or on the robotic arm 28. In some embodiments, the bonding cable 92 may be attached to the remote assembly 16 via the bonding point 90 on the frame 24, as shown. Thus, the components of the remote assembly 16 may be held at an equal electrical potential to the energized power line 102. By holding components at equal electrical potential, electrostatic discharge is avoided and the components of the remote assembly 16 are protected. In some embodiments, the remote assembly 16 further comprises at least one sensory device 95 to collect additional information to be communicated to the head-mounted display 46. The sensory device 95 may be any of a voltmeter, a strain gauge, and any other instrument for collecting additional information. The additional information may be sent to the head-mounted display 46 as part of the HUD. In some embodiments, the remote assembly 16 further comprises a remote wireless adapter 94 disposed on the frame 24, as shown. The remote wireless adapter 94 is operable to transmit and receive a wireless signal which may perform a similar function to that of the fiber-optic cable 44 discussed above. In some embodiments, both the remote wireless adapter 94 and the fiber optic cable 44 may be included. In such embodiments, the remote wireless adapter 94 may be disposed on the utility vehicle 12 and communicate with the remote assembly via fiber optic cable 44.

In embodiments that include the remote wireless adapter 94, a local wireless adapter 96 may be included on the head-mounted display 46, as shown. The local wireless adapter 96 is operable to transmit and receive signals to and from the remote wireless adapter 94, respectively. Said signals may provide similar function to the signal of the fiber-optic cable 44 described herein. Some embodiments may further comprise an input device 98 for controlling the at least one robotic arm 28 of the remote assembly 16. The input device 98, in some embodiments, comprises a joystick, a plurality of buttons, and/or a plurality of switches. Further, in some embodiments, the input device comprises the keyboard 718 and the mouse 720 of FIG. 7. In some embodiments, the input device 98 is paired with the head-mounted display 46 such that the input device 98 transmits a signal through the head-mounted display 46. Said signal may be transmitted using the local wireless adapter 96 or carried along fiber-optic cable 44 to the remote assembly 16 and to the robotic arm 28.

In some embodiments, the input device 98 is also operable to select and adjust the viewing parameters of the user, which may work in place of or in along with the at least one sensor 48 of the head-mounted display 46. For example, the remote capture device 26 may follow the view of the user via the sensor 48 and be further adjusted using the input device 98. The input device 98 may also be operable to select a zoom parameter for the zoom function described above. The zoom function may be desirable for the user to look closely at an object in the remote location. In some embodiments, the input device 98 is operable to receive, from the user, a requested viewing angle. Said requested viewing angle may then be communicated to the remote capture device 26.

The remote wireless adapter 94 and the local wireless adapter 96 may communicate wirelessly using one of a Wi-Fi network, a Bluetooth connection, and any other suitable form of wireless communication. Accordingly, embodiments are contemplated in which the user is in a completely separate location from the remote assembly 16 and communicates with the remote assembly 16 over an internet connection or via radio signals. In some embodiments, the hardware described in reference to FIG. 7 may be used by the user to communicate with the remote assembly 16, such as, the computer, which may interface with the head-mounted display 46.

During operation, the utility vehicle 12 of the aerial device 10 may be driven to a location and positioned adjacent to a utility pole 100 which supports the energized power line 102. For the sake of this example the area surrounding the energized power line 102 will be referred to as the remote location. The boom 18 is then raised such that the distal end approaches the energized power line 102. Next the bonding cable 92 is attached between the bonding point 90 on the frame 24 of the remote assembly 16 and the energized power line 102 to electrically bond the remote assembly 16 to the energized power line 102. In some embodiments, the tool 29 of the robotic arm 28 may be used to attach the bonding cable 92 to the energized power line 102. It should be understood that some embodiments may include additional bonding cables 92 to electrically bond other components to the energized power line 102. After bonding, the user may operate the robotic arm 28 using the input device 98 while viewing and hearing the operation of the robotic arm 28 using the head-mounted display 46. The user is able to look around at various points in the remote location by turning the user's head. The viewing angle of the user is detected by the sensor 48 on the head-mounted display 46 and communicated from the local wireless adapter 96 through the remote wireless adapter 94 to the remote assembly 16 to adjust the remote capture device 26 in order to match the user's viewing angle. Alternatively, the viewing angle may be communicated using the fiber-optic cable 44. In embodiments that include the static camera mount 76, the viewing angle may not need to be sent to the remote assembly 16. Instead, the processor 58 may use the viewing angle to select an appropriate stitched image to display to the user using the first visual display 50 and/or the second visual display 52 of the head-mounted display 46.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A system configured to be coupled to an end of a boom assembly and disposed in a remote operating environment for remote operation, the system comprising:
a frame portion;
a controller;
one or more robotic arms coupled to the frame portion;
a camera-supporting robotic arm coupled to the frame portion, the camera-supporting robotic arm comprising a plurality of pivotable joints, wherein the camera-supporting robotic arm is independently moveable from the one or more robotic arms;
a remote capture device fixed to a distal end of the camera-supporting robotic arm and operable to capture real-time sensory information including video data from the remote operating environment, the remote capture device comprising one or more cameras operable to capture the video data;
one or more microphones operable to capture audio data from the remote operating environment; and
a communication portion operable to transmit a signal comprising the real-time sensory information from the remote capture device to an operator and to receive a signal comprising control inputs from the operator to the controller, the control inputs including instructions for controlling motion of at least one of the one or more robotic arms and the camera-supporting robotic arm,
wherein a portion of the real-time sensory information is selected for presentation to the operator based at least in part on a viewing angle of the operator.

2. The system of claim 1, wherein the communication portion is communicatively coupled to a head-mounted display device configured to be worn by the operator.

3. The system of claim 2, wherein the communication portion transmits the signal comprising the real-time sensory information to the head-mounted display device such that the video data from the remote operating environment is displayed on the head-mounted display device, and wherein the viewing angle is associated with the head-mounted display device.

4. The system of claim 1, wherein the communication portion comprises a wireless adapter operable to transmit the signal comprising the real-time sensory information and receive the signal comprising control inputs wirelessly.

5. The system of claim 1, wherein the real-time sensory information further comprises electrical information associated with the remote operating environment.

6. The system of claim 1, wherein the real-time sensory information further comprises measured force information.

7. The system of claim 1, wherein the communication portion comprises a fiber optic cable disposed across an electrically insulated portion of the boom assembly.

8. A robotic assembly configured to be coupled to an end of a boom assembly and disposed in a remote operating environment for remote operation, the robotic assembly comprising:
a frame portion;
a controller;
one or more robotic arms coupled to the frame portion;
a camera-supporting robotic arm coupled to the frame portion, the camera-supporting robotic arm comprising a plurality of pivotable joints, wherein the camera-supporting robotic arm is independently moveable from the one or more robotic arms;
a remote capture device fixed to a distal end of the camera-supporting robotic arm and operable to capture real-time sensory information including video data from the remote operating environment, the remote capture device comprising:
one or more cameras configured to capture the video data from the remote operating environment; and
a communication portion operable to transmit a signal comprising the real-time sensory information from the remote capture device to an operator and to receive a signal comprising control inputs from the operator to the controller, the control inputs including instructions for controlling motion of at least one of the one or more robotic arms and the camera-supporting robotic arm,
wherein the control inputs include a change in viewing angle and viewing position of the operator such that the camera-supporting robotic arm is moved responsive to the change in viewing angle and viewing position of the operator.

9. The robotic assembly of claim 8, further comprising:
a robot tool coupled to a distal end of the one or more robotic arms.

10. The robotic assembly of claim 9, wherein the robot tool comprises a grapple device.

11. The robotic assembly of claim 9, wherein the robot tool comprises a drill device.

12. The robotic assembly of claim 8, wherein the communication portion is coupled to a head-mounted display device that provides the viewing angle and viewing position of the operator.

13. The robotic assembly of claim 12, wherein the controller is operable to select a portion of the video data corresponding to the viewing angle of the operator.

14. The robotic assembly of claim 8, further comprising:
one or more microphones disposed on the frame portion, the one or more microphones configured to capture audio data from the remote operating environment.

15. A remote capture device configured to be coupled to an end of a boom assembly and disposed in a remote operating environment for remote operation, the remote capture device comprising:
a frame portion;
a controller;
a camera-supporting robotic arm coupled to the frame portion, the camera-supporting robotic arm comprising a plurality of pivotable joints;
a rotatable camera mount fixed to a distal end of the camera-supporting robotic arm and operable to capture real-time sensory information including video data from the remote operating environment, the rotatable camera mount comprising:
a first camera mounted on a front portion of the rotatable camera mount; and
a second camera mounted on the front portion of the rotatable camera mount proximate to the first camera;
at least one microphone mounted to the frame portion, the at least one microphone configured to capture audio data from the remote operating environment; and
a communication portion operable to transmit a signal comprising the real-time sensory information from the remote capture device to an operator and to receive a signal comprising control inputs from the operator to the controller, the control inputs including instructions for controlling motion of the camera-supporting robotic arm, wherein the control inputs include a change in viewing angle and viewing position of the operator such that the camera-supporting robotic arm is moved responsive to the change in viewing angle and viewing position of the operator.

16. The remote capture device of claim 15, further comprising:
a plurality of motors, each motor of the plurality of motors disposed in a respective pivotable joint of the plurality of pivotable joints of the camera-supporting robotic arm, the plurality of motors configured to reposition the rotatable camera mount responsive to a change in the viewing angle of the operator.

17. The remote capture device of claim 16, wherein a portion of the video data is selected based on the viewing angle of the operator.

18. The remote capture device of claim 15, wherein the communication portion is coupled to a head-mounted display device with a first display portion and a second display portion.

19. The remote capture device of claim 18, wherein the communication portion transmits the signal comprising the real-time sensory information including a first portion of video data from the first camera and a second portion of video data from the second camera such that an image corresponding to the first portion of video data is displayed on the first display portion of the head-mounted display device and an image corresponding to the second portion of video data is displayed on the second display portion.

20. The remote capture device of claim 15, wherein the communication portion comprises a wireless adapter operable to transmit the signal comprising the real-time sensory information and receive the signal comprising control inputs wirelessly.

* * * * *